(12) United States Patent
Newell et al.

(10) Patent No.: US 8,843,510 B2
(45) Date of Patent: Sep. 23, 2014

(54) APPARATUS, SYSTEMS AND METHODS FOR PRODUCTION INFORMATION METADATA ASSOCIATED WITH MEDIA CONTENT

(75) Inventors: Nicholas Newell, Highlands Ranch, CO (US); Mi Chen, Aurora, CO (US); David Elliott, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 432 days.

(21) Appl. No.: 13/019,797

(22) Filed: Feb. 2, 2011

(65) Prior Publication Data

US 2012/0197930 A1    Aug. 2, 2012

(51) Int. Cl.
*G06F 17/30* (2006.01)
*H04N 21/482* (2011.01)

(52) U.S. Cl.
CPC ........ *G06F 17/3082* (2013.01); *H04N 21/4828* (2013.01)
USPC ......................................... 707/769

(58) Field of Classification Search
USPC .................................. 707/769, 740
See application file for complete search history.

(56) References Cited

U.S. PATENT DOCUMENTS

| 6,357,042 B2 | 3/2002 | Srinivasan et al. |
| 2005/0204398 A1 | 9/2005 | Ryal |
| 2007/0038612 A1 | 2/2007 | Sull et al. |
| 2007/0044010 A1 | 2/2007 | Sull et al. |
| 2009/0217352 A1* | 8/2009 | Shen et al. ........................ 726/3 |

* cited by examiner

*Primary Examiner* — Hosain Alam
*Assistant Examiner* — Johnese Johnson
(74) *Attorney, Agent, or Firm* — Lowe Graham Jones PLLC

(57) ABSTRACT

Systems and methods are operable to process production information related metadata content. An exemplary embodiment receives a user specification identifying at least one production information search parameter, searches production information metadata content associated with a media content event for instances of the user specified at least one production information search parameter, and generates a production information report configured to present information pertaining to the identified instances of the user specified at least one production information search parameter.

20 Claims, 5 Drawing Sheets

APPARATUS, SYSTEMS AND METHODS FOR PRODUCTION INFORMATION METADATA ASSOCIATED WITH MEDIA CONTENT

BACKGROUND

Media devices, such as a set top box, a stereo, a television, a computer system, a game system, or the like, are often configured to receive media content events. A media content event is communicated as part of a media content stream that comprises a video stream portion and an audio stream portion. Non-limiting examples of media content events communicated in a media content stream include, but are not limited to, a television program, a newscast, a broadcast sports event, a movie, or the like.

Often, the media content stream includes a metadata stream portion that comprises supplemental information of interest. However, the amount of supplemental information is typically limited. And, the metadata stream portion is not separately received.

There are significant amounts of, and different types of, supplemental information pertaining to the media content that may be of interest to certain users. For example, production information pertaining to the media content may be of interest. The production information may pertain to camera types used to film the media content, post process techniques used to process the media content, filming site location information, lighting sources and styles used during filming of the media content, costume and/or set designs used to stage the filming of the media content, or the like. Other information may also be of interest. However, this information is not included in the metadata stream portion of the media content stream.

Accordingly, there is a need in the arts to provide relatively large amounts of supplemental information pertaining to media content events.

SUMMARY

Systems and methods of processing production information related metadata content are disclosed. An exemplary embodiment receives a user specification identifying at least one production information search parameter, searches production information metadata content associated with a media content event for instances of the user specified at least one production information search parameter, and generates a production information report configured to present information pertaining to the identified instances of the user specified at least one production information search parameter.

BRIEF DESCRIPTION OF THE DRAWINGS

Preferred and alternative embodiments are described in detail below with reference to the following drawings.

DETAILED DESCRIPTION

Figure 1:
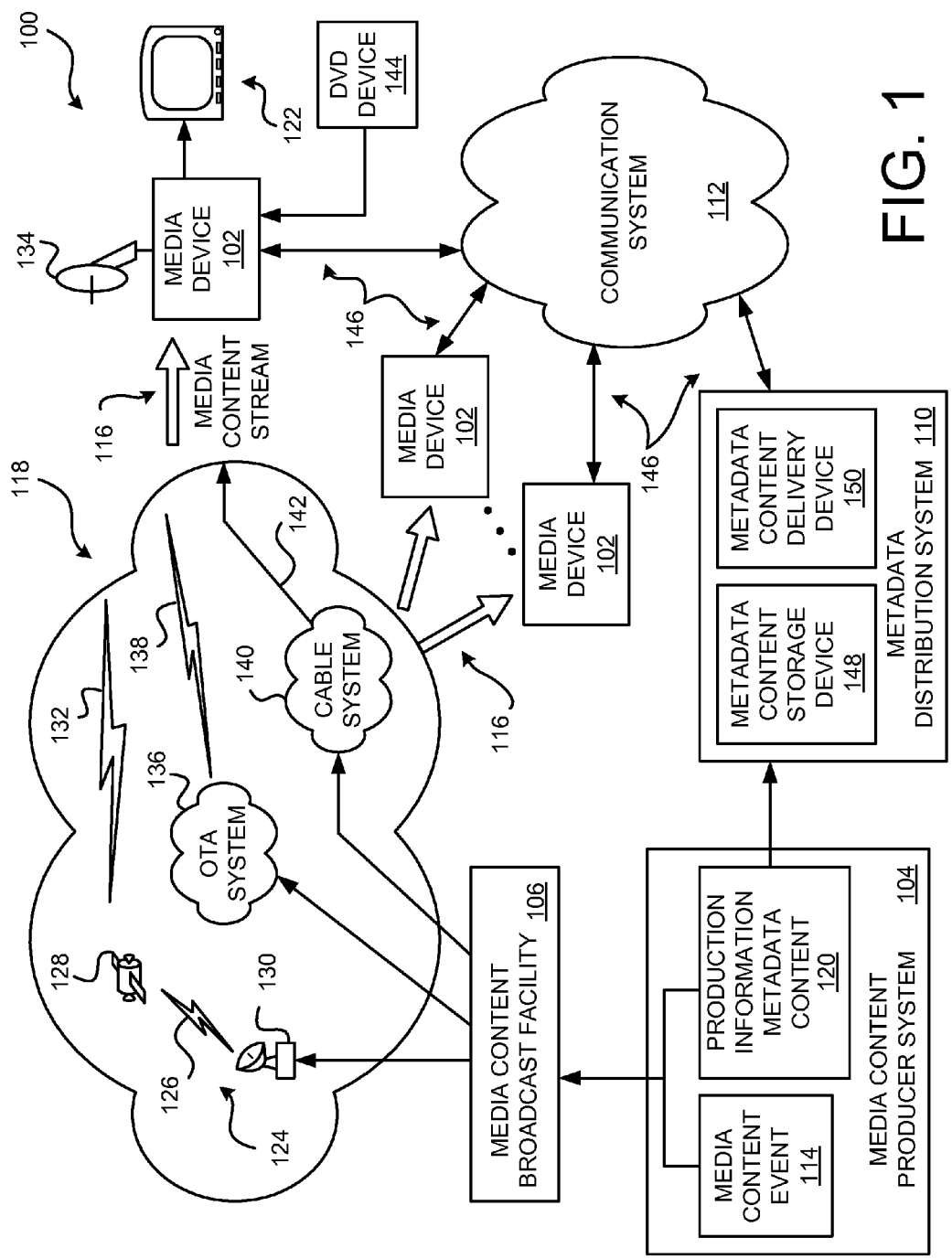
FIG. 1 is a block diagram of an embodiment of a production information metadata system.

FIG. 1 is a block diagram of an embodiment of a production information metadata system 100. The exemplary embodiment of the production information metadata system 100 is implemented in an exemplary environment that comprises a plurality of media devices 102, a media content producer system 104, a media content broadcast facility 106, a broadcast system 108, an optional metadata distribution system 110, and a communication system 112.

A media content event 114 is produced at the media content producer system 104 operated by a media content producer. The media content producer system 104 may comprise various site locations where filming occurs, locations where audio tracks are recorded, locations where post production processing occurs, and/or other locations related to the production of the media content event 114.

Exemplary media content events 114 include, but are not limited to, a television program, a newscast, a broadcast sports event, a movie, or the like. In an exemplary embodiment, the produced media content event 114 is provided to the media content broadcast facility 106. The media content event 114 is communicated in a media content stream 116 comprising a streaming video portion and a streaming audio portion. Further, the media content event 114 may comprise metadata information and an optional closed captioning stream.

In the various embodiments, the media content producer also produces production information metadata content 120. The production information metadata content 120 includes information of interest that is not included with the media content event 114. The production information metadata content 120 has various information that may be of interest to certain users.

In an exemplary embodiment, the production information metadata content 120 comprises various information pertaining to the production of the media content event 114. For example, but not limited to, the production related production information metadata content 120 may comprise camera information describing the cameras used to film the various scenes of the media content event 114 (camera type, manufacturer, model identifier; camera operation settings; camera altitude, attitude, direction and/or pitch; camera lens information; camera movement during filming, etc.). Thus, a user of the production information metadata content 120 may learn about the cameras, and how the cameras were used, to produce the media content event 114.

Production related information may comprise information pertaining to post production processing of the media content event 114 (aspect ratios, computer graphic imagery effects, color saturation adjustments, brightness adjustments, sound track information, etc.). Other information may describe the lighting equipment, and their arrangement, used to film the various scenes of the media content event 114. The information may include information describing the microphones, and their arrangement, used to record the audio portion of the media content event 114. The production related information may comprise information describing various equipment used during the filming of the various scenes of the media content event 114 (crane, dolly, boom hand-held, robotics, green screen, etc.). The production related production information metadata content 120 may comprise information describing set construction and/or design features. Thus, a user of the production information metadata content 120 may learn about the various equipment, and their associated use, that was used to film and/or produce the media content event 114.

The production related production information metadata content 120 may comprise information describing the actors, directors and other members of the production crew (special effects coordinators, camera operators, cinema photographers, grips, costume designers, etc.) during the filming and/or production of the various scenes of the media content event 114. For example, the actors, directors and other members of the production crew may provide commentary regarding their perspectives of the shooting of the various scenes of the media content event 114. The commentary may present video information, still images, audio commentary and/or textual descriptions. Thus, a user of the production information metadata content 120 may learn about why certain cameras and other filming equipment were selected, why the cameras were positioned in certain locations and/or orientations during filming, why the cameras and/or microphones were moved and/or operated during the filming, and why certain sets and/or costumes were selected.

The production related production information metadata content 120 may comprise information describing the filming location and other information pertaining to the sets used for the various scenes of the media content event 114. (set description and/or arrangement, GPS location coordinates, maps, filming date, time of day, weather conditions, season, etc.) The production related information may present video information, still image, audio commentary and/or textual descriptions. Thus, a user of the production information metadata content 120 may learn about the set locations used during the filming of the media content event 114, and accordingly, may plan a vacation or trip to later visit one or more of the set locations.

The production related production information metadata content 120 may comprise information describing various trivia that may be of interest. For example, one of the actors may have suffered an injury or may have had an anecdotal experience during the filming of one or more of the various scenes of the media content event 114. Thus, a user of the production information metadata content 120 may learn about the trivia.

The information provided in the production information metadata content 120 may include non-production information. For example, an advertisement or other non-production information may be included in the production information metadata content 120. An exemplary advertisement may include tourism information, resort or hotel accommodation information, tourist activity information, and/or transportation information that may be of interest to the user, such as when the advertisement pertains to one or more set locations. Another exemplary advertisement may present information for buying a camera, such as, but not limited to a camera used in the filming of the media content event 114. As yet another non-limiting example, an exemplary merchandising advertisement may present information about a vehicle used in the media content event 114, such as a sports cars, water craft, or air craft. Interactive linking information and/or an active link may be provided so that the user has convenient access to a website or the like of the advertiser or the provider of the other non-production information.

The media content stream 116 comprises a plurality of streamed media content events 114. The media service provider, operating the exemplary media content broadcast facility 106 generates one or more of media content streams 116. The media content streams 116 are communicated out to a plurality of media devices 102 over a broadcast system 118. Some media content broadcast facilities 106 simultaneously broadcast many media content streams 116 that may include hundreds of different media content events 114.

The media devices 102, when in operation, are configured by a user to select one of the plurality of simultaneously broadcast media content events 114 for presentation on a media presentation system 122. An exemplary media device 102 includes, but is not limited to, a set top box (STB) that is communicatively coupled to the broadcast system 118. Other embodiments of the media device 102 include a television (TV), a digital video disc (DVD) player, a game playing device, a personal computer (PC), a cellular phone, a portable media device, or a personal device assistant (PDA). The media devices 102 are configured to present and/or store selected media content events that are received in the media content stream 116. Exemplary media presentation devices 122 include, but are not limited to, TV's, stereos, radios, surround sound systems, personal computers or the like that may be communicatively coupled to the media device 102. In some embodiments, the media device 102 and the media presentation system 122 may be an integrated single electronic media device.

In the various embodiments, the media devices 102 receive the media content stream 116 via the broadcast system 118. The media devices 102 may be identical to, or may be substantially similar to, other media devices 102. Or, the media devices 102 may be quite different from each other. Further, the media devices 102 may be coupled to different broadcast system types.

An exemplary broadcast system 118 comprises a satellite broadcast system 124. One or more of the media content streams 116 reside in a transport channel 126 that is uplinked to a plurality of satellites 128, via a corresponding transmit antenna 130. The respective transport channels 126 are then communicated, in the form of a wireless signal 132, from one or more of the satellites 128 down to a receiver antenna 134 that is communicatively coupled to the media device 102. The received wireless signal 132 (with the media content stream 116) is then communicated from the receiver antenna 134 to the media device 102. The receiver antenna 134 and the media device 102 may be configured to receive multiple wireless signals 132 from a plurality of satellites 128.

Alternatively, or additionally, the plurality of media content events 114 may be broadcast to the media devices 102 via an over the air (OTA) system 136. For example, the media content broadcast facility 106 may be a local program provider that broadcasts media content events 114 to the media devices 102 using a wireless signal 138. The received wireless signal 138 with the media content stream 116 is received at the receiver antenna 134, or may be received directly by a receiver (not shown) residing in the media device 102.

Alternatively, or additionally, the plurality of media content events 114 may broadcast to the media devices 102 via a cable system 140. For example, the media content broadcast facility 106 may employ a coaxial cable and/or fiber optic cable 142 that is coupled to the media device 102. The media content stream 116 is received directly by the media device 102.

The media content events 114 may also be received at the media device 102 in other manners. For example, a digital video disk (DVD) device 144 may be coupled to the media device 102. The media content event 114, residing on a DVD, is communicated from the DVD device 144 to the media device 102 as a media content stream 116.

Alternatively, or additionally, the media device 102 may receive the media content event 114 directly from the media content broadcast facility 106 or from another source over the communication system 112, via a communication link 146. In an exemplary embodiment, the communication system 112 comprises the Internet. The communication link 146 may be a dedicated communication link, such as an Ethernet communication link, a fiber optic communication link, a wireless link, a cable link, or the like. In some embodiments, the links 146 may be established through the communication system 112, or may be established through a portion of the communication system 112.

The production information metadata content 120 may be communicated to the media devices 102 in a variety of manners. In an exemplary embodiment, the production information metadata content 120 is communicated to the media content broadcast facility 106. The production information metadata content 120 is incorporated into one or more of the media content streams 116 and is broadcast to the media devices 102 via one or more of the exemplary forms of the broadcast system 118. In some embodiments, the production information metadata content 120 may be separate from the media content event 114, and/or may be incorporated into the media content event 114 as a portion thereof.

Alternatively, or additionally, the production information metadata content 120 may be provided to the media device 102 via the exemplary metadata distribution system 110. In this exemplary embodiment, the production information metadata content 120 is communicated from the media content producer system 104 to the exemplary metadata distribution system 110. The received production information metadata content 120 is stored into a metadata content storage device 148. The metadata content storage device 148 is configured to store a plurality of production information metadata content 120 associated with different media content events 114. A metadata content delivery device 150 is configured to establish a communication link 146 with the media devices 102. Once the communication link 146 is established between the metadata content delivery device 150 and the media device 102, the metadata content delivery device 150 communicates selected ones of the production information metadata content 120 to the media devices 102, via the communication system 112.

Alternatively, or additionally, the production information metadata content 120 may be provided from any suitable memory medium that the media device 102 may access. For example, but not limited to, the production information metadata content 120 may be stored on a DVD. The production information metadata content 120 may be stored on the same DVD as the media content event 114, or may be stored on a different DVD. For example, a plurality of different production information metadata content 120 may be saved onto a single DVD.

In an exemplary operating scenario, the user may be receiving the media content event 114 from the media content broadcast facility 106 which is presented on the media presentation system 122. Concurrently, the user may be accessing the production information metadata content 120 from the exemplary DVD device 144 using the same media device 102 or a different media device 102. In this operating scenario, the user may be presenting the production information metadata content 120 on a different media presentation system 122, such as a personal computer, portable media device or the like.

In some situations, a plurality of production information metadata content 120 with different subject matter is produced for the media content event 114. For example, but not limited to, scene location production information metadata content 120 may comprise information pertaining to set locations and other related information. Equipment information production information metadata content 120 may pertain to the various equipment used in filming of the media content event 114. As yet another example, production process production information metadata content 120 may describe post production information or the like. Any number of different production information metadata content 120 may be produced and separately communicated to the media devices 102.

In the various embodiments, the production information metadata content 120 may be communicated to the media device 102 at any suitable time. For example, the production information metadata content 120 may be provided as a premium service and separately communicated, such as through an on-demand system. Or, the production information metadata content 120 may be communicated to the media device over the broadcast system 118 before or after the associated media content event 114 is broadcasted to the media device 102. If the production information metadata content 120 is stored on a memory medium, such as a DVD or the like, the user may separately purchase or obtain the DVD or other memory medium. If the production information metadata content 120 is available from the metadata distribution system 110, the user may separately obtain the production information metadata content 120 at their convenience.

Figure 2:
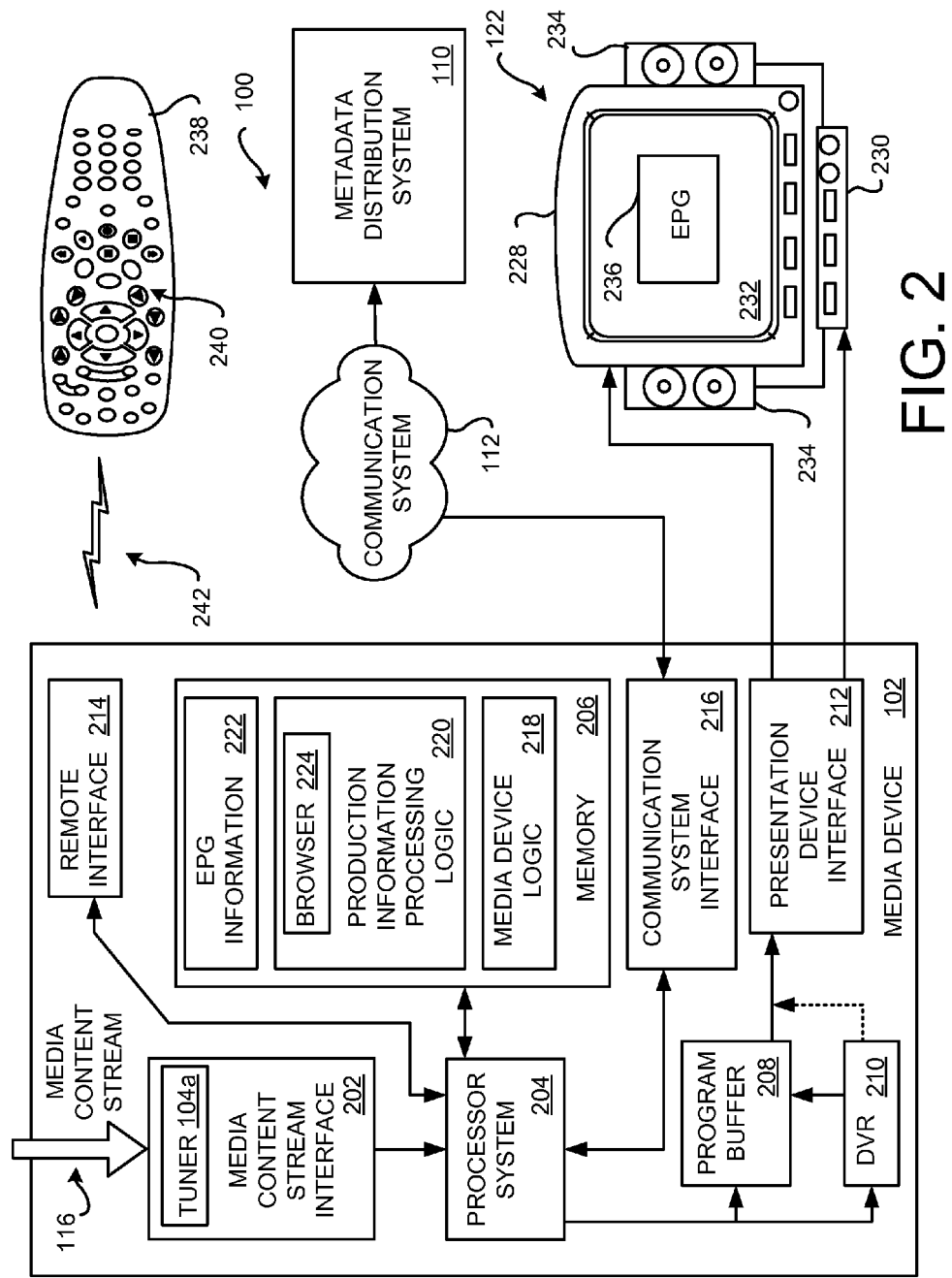
FIG. 2 is a block diagram of an embodiment of an exemplary media device.

FIG. 2 is a block diagram of an embodiment of an exemplary media device 102. The non-limiting exemplary media device 102 comprises a media content stream interface 202, a processor system 204, a memory 206, a program buffer 208, an optional digital video recorder (DVR) 210, a presentation device interface 212, a remote interface 214, and an optional communication system interface 216. The memory 206 comprises portions for storing the media device logic 218, the production information metadata processing logic 220, the electronic program guide (EPG) information 222. The production information metadata processing logic 220 may include, or have access to, a browser 224. In some embodiments, the media device logic 218, the production information metadata processing logic 220, and/or the browser 224 may be integrated together, and/or may be integrated with other logic. In other embodiments, some or all of these memory and other data manipulation functions may be provided by using a remote server or other electronic devices suitably connected via the Internet or otherwise to the media device 102. Other media devices may include some, or may omit some, of the above-described media processing components. Further, additional components not described herein may be included in alternative embodiments.

The functionality of the media device 102, here a set top box, is now broadly described. The media content provider provides program content that is received in one or more media content streams 116 from the media content broadcast facility 106. Alternatively, or additionally, the media content stream 116 can be received from one or more other sources, such as, but not limited to, the Internet.

In an exemplary embodiment, the media content stream 116 is received by the media content stream interface 202. One or more tuners 226 in the media content stream interface 202 selectively tune to a particular media content stream 116 in accordance with instructions received from the processor system 204. The processor system 204, executing the media device logic 218 and based upon a request for a program of interest specified by a user, parses out program content associated with the specified media content event 114. The media content event 114 of interest is then assembled into a stream of video and/or audio information which may be stored by the program buffer 208 such that the program content can be streamed out to the media presentation system 122, via the presentation device interface 212. Alternatively, or additionally, the parsed out program content may be saved into the DVR 210 for later presentation. The DVR 210 may be directly provided in, locally connected to, or remotely connected to, the media device 102.

In this simplified embodiment, the presentation device interface 212 is illustrated as coupled to the media presentation system 122 that includes a visual display device 228, such as a television (hereafter, generically a TV), and an audio presentation device 230, such as a surround sound receiver (hereafter, generically, a speaker). Other types of output devices may also be coupled to the media device 102, including those providing any sort of stimuli sensible by a human being, such as temperature, vibration and the like. The video portion of the streamed program content is displayed on the TV display 232 and the audio portion of the streamed program content is reproduced as sounds by the plurality of speakers 234.

From time to time, information populating the EPG information 222 portion of the memory 206 is communicated to the media device 102. The EPG information 222 stores information pertaining to the scheduled programming for the media content events 114. The information may include, but is not limited to, a scheduled presentation start and/or end time, a program channel, and descriptive information of the media content events 114. The descriptive information of the media content events 114 may include the title, names of performers or actors, date of creation, and a summary describing the nature of the media content event 114. Any suitable information may be included in the production information. Upon receipt of a command from the user requesting presentation of an EPG 236, the information in the EPG information 222 is retrieved, formatted, and then presented on the display 232 as the EPG 236.

The exemplary media device 102 is configured to receive commands from a user via a remote control 238. The remote control 238 includes one or more controllers 240. The user, by actuating one or more of the controllers 240, causes the remote control 238 to generate and transmit commands, via a wireless signal 242, to the media device 102. The commands control the media device 102 and/or control the media presentation devices 122. The wireless signal 242 may be an infrared signal or an RF signal.

The above processes performed by the media device 102 are generally implemented by the processor system 204 while executing the media device logic 218. Thus, the media device 102 may perform a variety of functions relating to the processing and presentation of the media content event 114.

The communication system interface 216 is configured to provide connectivity of the media device 102 to other remote devices via the communication system 112. In an exemplary embodiment that is configured with Internet connectivity, the communication system interface 216 may be a suitable modem, or a device configured to connect to a modem. For example, the exemplary browser 224 may be used to access and/or retrieve the production information metadata content 120 from a remote site, such as a web site and/or the exemplary metadata distribution system 110. The accessed production information metadata content 120 may be searched, filtered, sorted or otherwise processed at the media device 102. Additionally, or alternatively, the retrieved production information metadata content 120 may be stored by the media device 102, such as in the DVR 210, memory 206, or another suitable memory medium. The communication system interface 216 may be any suitable device that is configured to provide connectivity of the media device 102 to the communication system 112.

Figure 3:
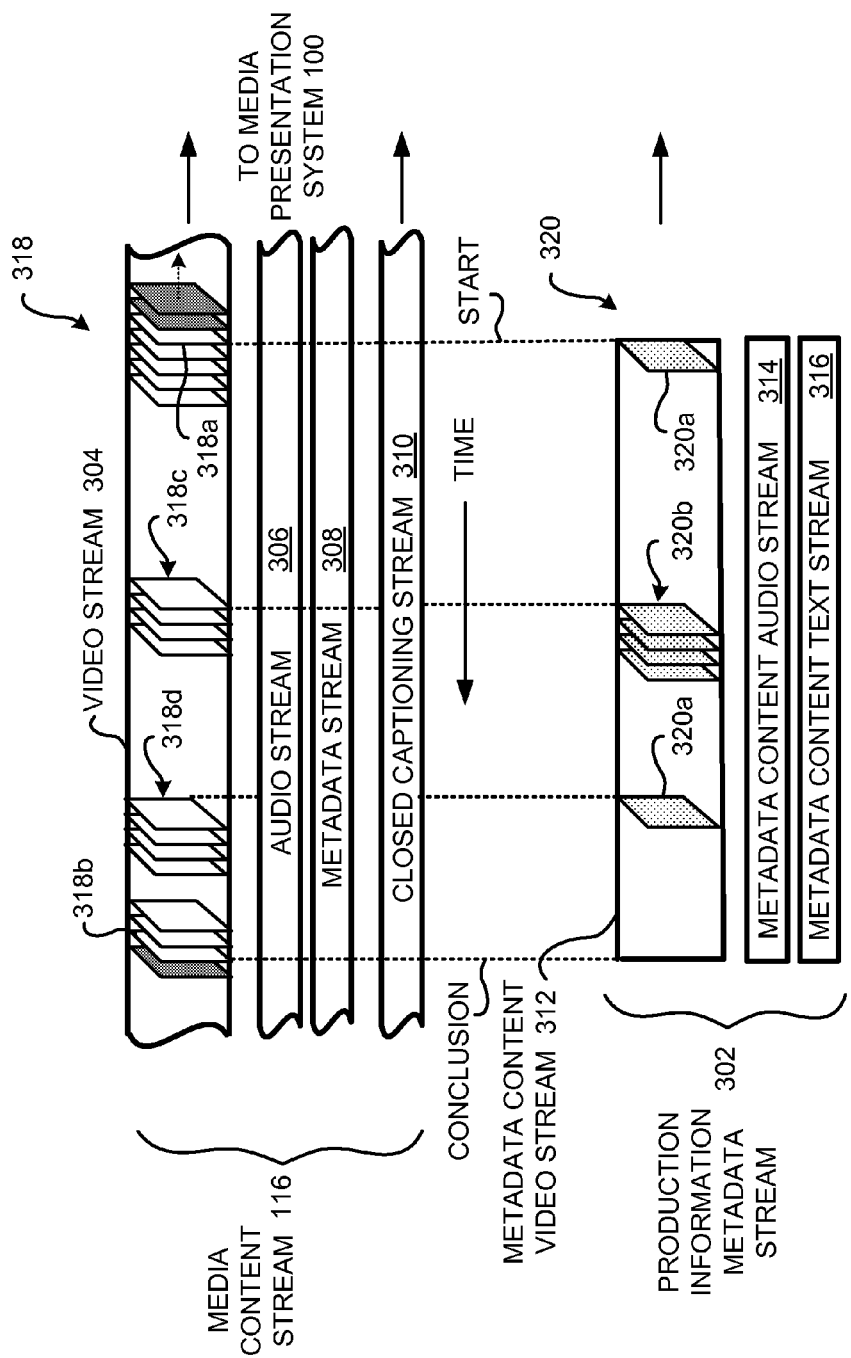
FIG. 3 conceptually illustrates an exemplary media content stream and an exemplary production information metadata content stream.

FIG. 3 conceptually illustrates an exemplary media content stream 116 and an exemplary production information metadata content stream 302. The media content stream 116 communicates, transports, or otherwise carries, a plurality of media content events 114 to the media device 102. The media content stream 116 comprises a video stream 304, a corresponding audio stream 306, a corresponding metadata stream 308, and an optional closed captioning stream 310. The production information metadata content stream 302 communicates, transports, or otherwise carries, the production information metadata content 120 to the media device 102. The production information metadata content stream 302 may comprise a metadata content video stream 312, a corresponding metadata content audio stream 314, and/or a corresponding metadata content text stream 316.

The video stream 304 is comprised of a plurality of serially sequenced video frames 318. Each video frame 318 has data or information used to render and present a particular image of the media content event 114. The video frames 318 are serially presented so as to create a moving picture. The video frames 318 may use one of the recent moving picture experts group (MPEG) formats, the material exchange format (MXF), and other packetized video formats, which now provide for portions in the video stream 304 that are configured to carry various non-video data.

The audio stream 306 may include spoken words, music, and background sounds of the media content event 114. The audio stream 306 is sequenced with the video frames 318 such that spoken words, music, and background sounds of the audio stream 306 correspond in time with the moving picture.

Some media content events 114 may include the exemplary metadata stream 308 which contains other information of interest. For example, the metadata stream 308 may include the title of the media content event 114, generally describe the subject matter of the media content event 114, indicate start and conclusion times of the media content event 114, and other information that is less informative than the information provided by the various embodiments of the production information metadata content 120.

The optional closed captioning stream 310 is typically a textual presentation of the words of the audio stream 306 for hearing impaired viewers or for viewers in an area with relatively loud ambient noise levels, such as a bar or the like. The words of the closed captioning stream 310 are sequenced so as to generally correspond to the spoken words of the audio stream 306.

In an exemplary embodiment, the media content event 114 is communicated to the media device 102 in a streaming fashion. The media content event 114, based upon additional processing by the media device 102, is also streamed from the media device 102 to the components of the media presentation system 122. At the start of the media content event 114, a first one of the video frames 318a is received and processed, followed by subsequent ones of the video frames 318. At the conclusion of the media content event 114, a last video frame 318b is received.

Typically, groupings of the video frames 318 correspond to scenes of the media content event 114. For example, an exemplary scene may have its video portion in the video frames 318b. Subsequent video frames 318 can be similarly grouped into scenes. For example, a later exemplary scene may have its video portion in the video frames 318d.

Information in the audio stream 306, the metadata stream 308 and the closed captioning stream 310 is similarly received. The information, in an exemplary format, is encapsulated in packets that are associated with ones of the video frames 318 so that the audio portions, metadata portions, and/or the closed captioning portions of the media content event 114 are presented in synchronism with presentation of the video frames 318.

The production information content stream 302 similarly comprises streaming information in an exemplary embodiment. For example, the metadata content video stream 312 may comprise a plurality of video frames 320. In an exemplary embodiment, one or more of the video frames 320 are associated with corresponding ones of the video frames 318 of the media content event 114. For example, at the start of the media content event 114, a first video frame 320a is associated with the first video frame 318a. A user, upon accessing the first video frame 320a, would be able to view an image of the production information metadata content 120. For example, the image of the first video frame 320 may correspond to a map, a still photograph, textual image information, graphical information, or the like.

In an exemplary embodiment wherein the production information metadata content 120 is presented on a separate media device 102, the image associated with the video frame 320a may be presented for some duration. The presentation duration may correspond to a predefined duration, may correspond to some input from the user, or may correspond to the end of, or a conclusion of, the scene associated with the first video frame 318a. The video frame 320a may even be the same image as in the corresponding first video frame 318a, or may include a smaller sized image of the first video frame 318a with other presented information. Additional production information associated with the video frame 318a and/or 320a may be available in the corresponding metadata content audio stream 314 (which presents audio information corresponding to the video frame 318a) and/or a corresponding metadata content text stream 316 (which presents text information corresponding to the video frame 318a).

Further, selected ones of the video frames 320 may be assembled into groups of related video frames 320 that correspond to particular scenes of the media content event 114. For example, the video frames 320b may be associated with the group of video frames 318c that correspond to a particular scene. In some situations, the number of video frames 320a may correspond to the number of video frames 318c such that when the scene is presented by the video frames 318c, the associated video frames 320b may be accessed and presented on the media device 102 or another media device 102 in a synchronized manner. That is, the video information in the group of video frames 320b may be presented in synchronism with presentation of the video frames 318b.

Each of the video frames 318 of the media content event 114 include identification information. The identification information, such as a time stamp or the like, is used to ensure that when the media content event 114 is presented, the video frames 318 are presented in the correct sequence. Embodiments of the production information metadata content 120 may use this identifying information to associate the video frames 320 of the metadata content video stream 312, and information in the corresponding metadata content audio stream 314 and/or a corresponding metadata content text stream 316, with the video frames 318. Alternatively, or additionally, the producers of the media content event 114 and the production information metadata content 120 may include special purpose flags, tags or the like that are used to associate portions of the production information metadata content 120 with scenes or portions of the media content event 114. Thus, embodiments may provide an association between the information of the production information metadata content 120 and the related content of the media content event 114.

In some embodiments, the number of video frames 320 may be larger than, or less than, the number of video frames 318 associated with a particular scene. For example, the production information metadata content 120 for a particular scene may need more presentation time, or less presentation time.

In embodiments where the user is being presented both the media content event 114 and the production information metadata content 120 in a synchronous and coordinated manner, presentation of the media content event 114 may be paused until completion of presentation of the related production information metadata content 120. For example, presentation of a scene may be paused so that the user can be presented the information pertaining to the cameras used to film that scene and/or to present set location information associated with that scene. On the other hand, if the production information metadata content 120 is being presented separately from the media content event 114, then there is no particular need to address differences between the presentation duration of the media content event 114 and the presentation duration of the production information metadata content 120. Presentation of the media content event 114 may be paused until the user has finished presentation of the production information metadata content 120. Presentation of the media content event 114 may then resume.

In some situations, the user may be navigating about the production information metadata content 120. That is, the user may selectively control presented portions of the production information metadata content 120 based on factors of interest. For example, the user may be searching the production information metadata content 120 for scenes that were filmed using a particular type of camera and/or using specific camera settings or lenses. Once the scenes are identified from the production information metadata content 120, those particular related scenes may be retrieved and presented during the media content event 114 if the media content event 114 is also available for presentation.

As another example, the user may be interested in a particular set location. The production information metadata content 120 may be searched to identify the scenes filmed at the set location of interest. Once the scenes are identified from the production information metadata content 120, those particular related scenes may be retrieved and presented from the media content event 114 if the media content event 114 is also available for presentation. Further, a set location may have been used in a plurality of different media content events 114. The user may search a plurality of different production information metadata content 120 associated with the plurality of different media content events 114. Once the scenes are identified from the different production information metadata content 120, those particular related scenes from the different media content events 114 may be retrieved and presented if the different media content events 114 are available for presentation.

The duration of the exemplary production information metadata content stream 302 is conceptually illustrated as having the same duration as the media content stream 116 that contains the media content event 114. However, the production information content stream 302 may have a longer duration, or a shorter duration, than the duration of the media content event 114 depending upon the amount of information contained in the production information metadata content 120.

Figure 4A:
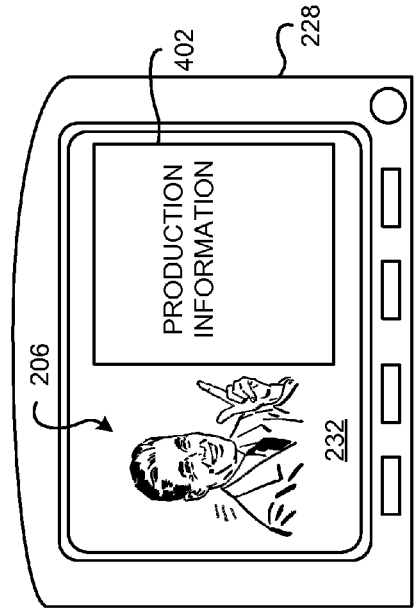
FIGS. 4A-4D conceptually show a plurality of presentation formats that may be used for presentation of the production information metadata content.

FIGS. 4A-4D conceptually show a plurality of exemplary visual presentation formats that may be used for presentation of the production information metadata content 120. FIG. 4A presents a video image of the media content event 114, conceptually representing a speaking man 402, presented on the display 232 of the exemplary visual display device 228. The production information metadata content 120 is presented as a picture in picture (PIP) 404 pop up window. The PIP 404 may be of any suitable size and may be presented at any location on the display 232. In some embodiments, the production information metadata content 120 includes information pertaining to the presentation format and display location of the PIP 404. Alternatively, or additionally, the user may specify the presentation format and/or the display location of the PIP 404.

Figure 4B:
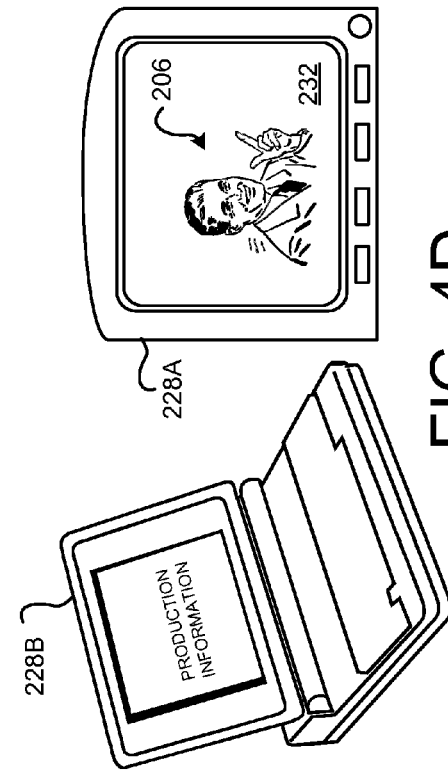

FIG. 4B presents a video image of the speaking man 402, and the production information metadata content 120 associated with the scene showing the speaking man 402, using a side-by-side display format. In this exemplary embodiment, the graphical or video content of the production information metadata content 120 is presented as an image 406 adjacent to the presented video image of the media content event 114.

Figure 4C:
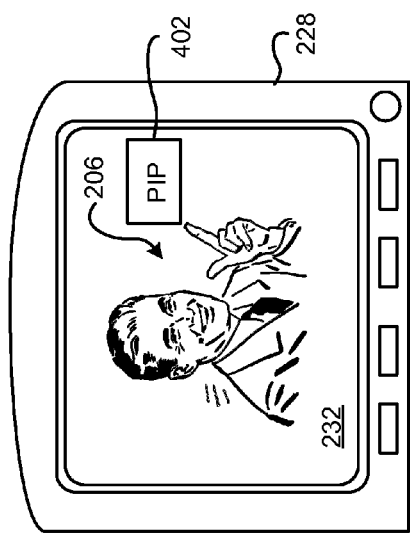

FIG. 4C presents a video image of the speaking man 402 and the production information metadata content 120 presented using a banner 408. The banner 408 may present textual information, graphical information, and/or video content. The presented information may be presented below, above, or to the sides of the presented video image of the media content event 114.

Figure 4D:
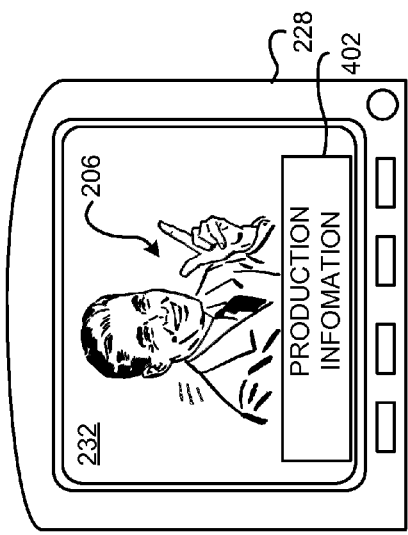

FIG. 4D presents a video image of the speaking man 402 on a first visual display device 228a. The production information metadata content 120 is presented on a second visual display device 228b. Here, the presented production information metadata content 120 may be associated with the scene showing the speaking man 402. However, the presented production information metadata content 120 may present any information of interest that may be related to the presented media content event 114. Any second visual display device 228, such as a mobile phone, personal device assistant, electronic pad, or the like, may be used to present the production information metadata content 120.

The production information metadata content 120 may be presented in any suitable format depending upon the embodiment and depending upon characteristics of the production information metadata content 120. Further, the information may be presented using a plurality of different formats. And, in some instances, the information may be concurrently presented using multiple formats.

The information provided in the production information metadata content 120 may include video images, still images, graphics, audio information, textual information, or combinations thereof. For example, but not limited to, the production information metadata content 120 may present video images or still images that show different camera angles, different scene takes, and/or supplemental images of the set configuration and/or hardware. As another non-limiting example, the production information metadata content 120 may present textual information describing the cameras used to film the presented scene. As yet another non-limiting example, when audio information is presented, the production information metadata content 120 may present alternative music scores and/or audio commentary by the actors, directors and other members of the production crew.

In some embodiments, the media device 102 and/or the media presentation system 122 may be configured to access remote Internet web sites via the exemplary communication system 112. Accordingly, the presented production information metadata content 120 may include selectable active Internet web site links or the like. Upon selection of the link, the media device 102 and/or the or the media presentation system 122 establishes a communication link 146 to the Internet web site, and then retrieves and presents information of interest. For example, the user may be interested in visiting one or more set locations. The presented production information metadata content 120 may present set location information, such as images, maps, directions or the like. Also, a travel agent Internet web site link or the like may be presented. Upon selection of the active Internet web site link, the user may make arrangements to schedule their trip to visit the set locations using the travel agent Internet web site.

Further, the production information metadata content 120 may include a classifier or other information that classifies the character of the available portions of the production information metadata content 120. The classifiers may be used to indicate to the media device 102 that the production information metadata content 120 is text, is a video, is an image, is audio, and/or is interactive.

Figure 5:
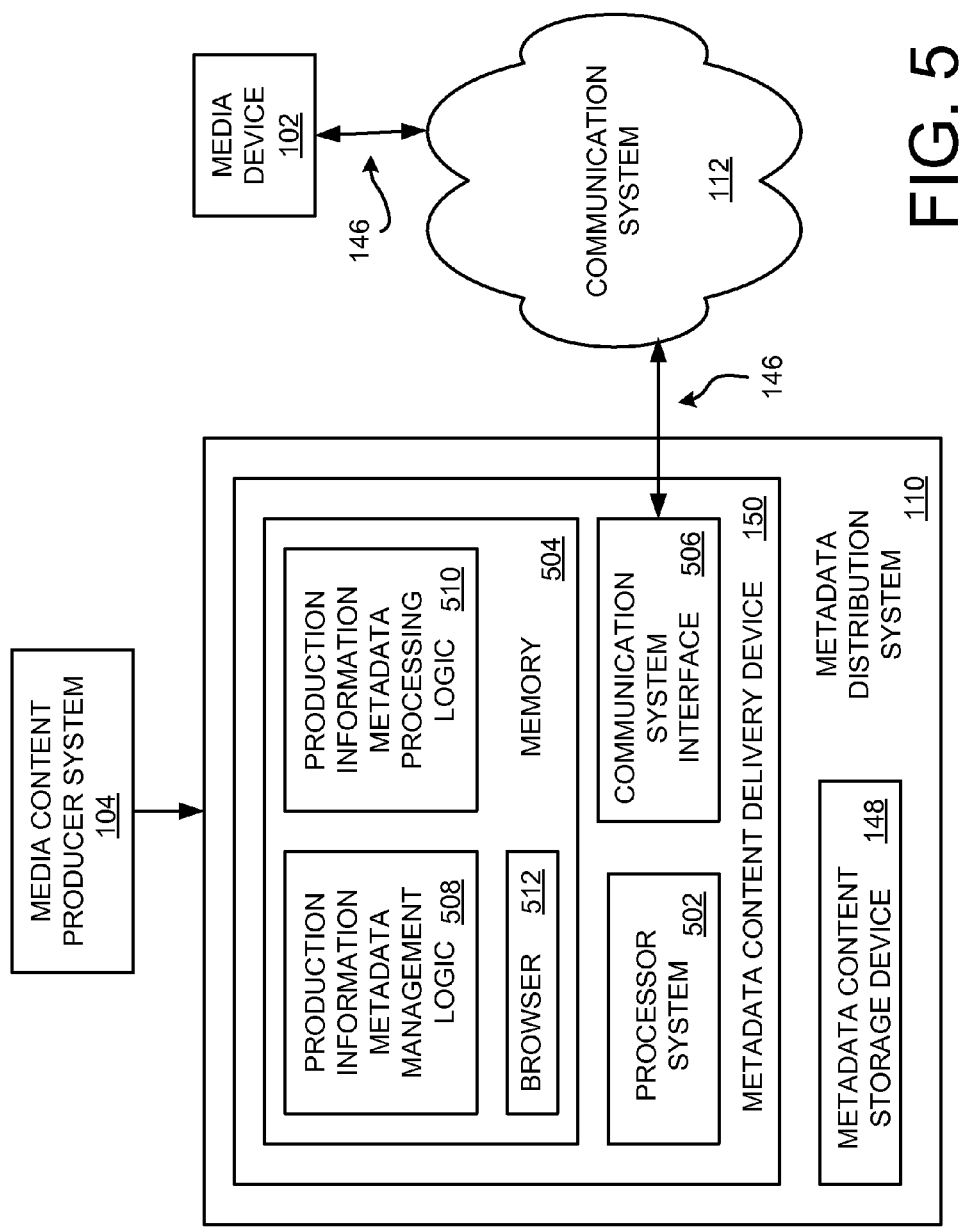
FIG. 5 is a block diagram of an embodiment of an exemplary metadata distribution system.

FIG. 5 is a block diagram of an embodiment of an exemplary metadata distribution system 110. The non-limiting exemplary metadata distribution system 110 comprises the metadata content storage device 148 and the metadata content delivery device 150. The exemplary metadata content storage device 148 is configured to store a plurality of production information metadata content 120 associated with different media content events 114. The production information metadata content 120 may be provided by the media content producer system 104 and/or from other remote devices, such as an Internet web site or the like, that is accessible via the communication system 112. The metadata content storage device 148 may employ any suitable memory medium. In some embodiments, the metadata content storage device 148 comprises a plurality of distributed memory medium devices.

The metadata content delivery device 150 comprises a processor system 502, a memory 504, and a communication system interface 506. The memory 504 comprises portions for storing the production information metadata management logic 508 and the production information metadata processing logic 510. The metadata content delivery device 150 may include, or have access to, a browser 512. In some embodiments, the production information metadata management logic 508, the production information metadata processing logic 510, and/or the browser 512 may be integrated together, and/or may be integrated with other logic. In other embodiments, some or all of these memory and other data manipulation functions may be provided by and using remote servers or other electronic devices suitably connected via the Internet or otherwise to the metadata distribution system 110. Other media devices may include some, or may omit some, of the above-described media processing components. Further, additional components not described herein may be included in alternative embodiments.

The communication system interface 506 is configured to provide connectivity of the metadata distribution system 110 to media devices 102 and/or to other remote devices via the communication system 112. In an exemplary embodiment that is configured with Internet connectivity, the communication system interface 506 may be a suitable modem, or a device configured to connect to a modem. For example, the exemplary browser 512 may be used to access and/or retrieve the production information metadata content 120 from a remote site, such a web site and/or the exemplary metadata distribution system 110. The communication system interface 506 may be any suitable device that is configured to provide connectivity of the media device 102 to the communication system 112. Preferably, the communication system interface 506 is configured to establish a plurality of communication links 146 with a plurality of media devices 102.

Accordingly, the metadata distribution system 110 may be in concurrent communication with a relatively large number of media devices 102.

The production information metadata management logic 508 is configured to manage the production information metadata content 120. The production information metadata management logic 508 manages storing and tracking of the production information metadata content 120 in the metadata content storage device 148. When production information metadata content 120 is received from the media content producer system 104, the production information metadata management logic 508 tracks the storage so that in response to a request from a media device 102 for all of, or a portion of, the production information metadata content 120, the requested production information metadata content 120 can be retrieved from the metadata content storage device 148. As another non-limiting example, the production information metadata processing logic 510 may identify and access particular ones of the stored production information metadata content 120 based on a request from one or more media devices 102. The production information metadata management logic 508 is configured to access the production information metadata content 120 from the metadata content storage device 148 so that the searching and/or filtering can be performed by the production information metadata processing logic 510. In some embodiments, the production information metadata management logic 508 may be configured to identify which particular production information metadata content 120 based on the presentation schedule of media content that is to be broadcast from the media content producer system 104. Accordingly, relevant production information metadata content 120 can be identified, retrieved and/or stored at the metadata distribution system 110. In some embodiments, the metadata distribution system 110 may be configured to notify one or more media devices 102 of the availability of production information metadata content 120 associated with media content events 114 that are scheduled to be broadcast over the broadcast system 118.

The production information metadata processing logic 510 is configured to provide searching and/or filtering functionality such that the production information metadata content 120 may be searched and/or filtered in accordance with one or more specified parameters. Further, the plurality of stored production information metadata content 120, or selected ones of the stored production information metadata content 120, may be searched and/or filtered using the one or more specified parameters.

Upon completion of the processing, a suitable production information report may optionally be generated and communicated to the media device 102, and/or communicated to another electronic device, for presentation to the user. The production information reports may present any level of granularity (detail of information) that is of interest to the user. For example, the search may specify identification of a particular camera type and scenes filmed using that camera type. The production information report may summarize, and indicate the number of scenes. Or, the production information report may go into greater detail and identify the particular scenes. The production information report may present even greater detail, such as the camera settings or other camera related information. Further, the production information report may indicate other information of interest, such as, but not limited to, the camera operator and/or the set location. The production information reports may be automatically generated by the production information metadata processing logic 510 to present a preconfigured level of detail. Alternatively, or additionally, the user may specify the level of detail of the generated production information report. Further, based on the search results, the user and/or the production information metadata processing logic 510 may generate a series of different production information reports presenting different levels of detail and/or different types of information.

To illustrate, the user of a media device 102 may identify a particular production information metadata content 120 and specify a search for all scenes filmed using a particular camera and/or all scenes filmed using a particular camera lens. The production information metadata processing logic 510 may search and/or filter the specified production information metadata content 120 to identify scenes filmed using a particular camera and/or all scenes filmed using a particular camera lens. As another non-limiting example, the user may specify a search for scenes filmed at a particular set location. The production information metadata processing logic 510 may search and/or filter the specified production information metadata content 120 to identify scenes filmed at the specified set location. A suitable production information report may then be generated for presentation to the user.

Alternatively, or additionally, the plurality of stored production information metadata content 120, or selected ones thereof, may be searched for one or more specified parameters. For example, the user may request a search for all movies that were filmed using a particular camera, filmed using a particular camera lens, and/or filmed at a particular set location. The production information metadata processing logic 510 may search and/or filter the plurality of production information metadata content 120 to identify movies satisfying the specified parameters. A suitable production information report may then be generated for presentation to the user.

Further, the production information metadata processing logic 510 may be configured to search and/or filter a plurality of production information metadata content 120 based upon one or more search production information parameters specified by a user. For example, the plurality of production information metadata content 120 may be identified based upon a user specification of a plurality of identified media content events 114. For example, the user may provide a list of titles of a plurality of media content events 114 of interest. As another example, the user may specify a listing of actors, directors and/or other members of the production crew that are of interest. The production information metadata processing logic 510 may then search/filter available production information metadata content 120 for a plurality of media content events 114 to identify the specified actors, directors and/or other members of the production crew. Further processing may then be optionally performed using the production information metadata content 120 of the identified media content events 114.

Further, the production information metadata processing logic 510 may be configured to comparatively search and/or filter a selected production information metadata content 120, or comparatively search and/or filter a plurality of different production information metadata content 120. For example, the user may request a comparison search for scenes filmed with a first type of camera and scenes filmed with a second type of camera. A suitable comparison production information report may be generated that indicates the qualifying scenes filmed using the specified camera types, and/or that summarizes the comparison results. For example, a summary production information report may indicate ten scenes of the specified media content event 114 were filmed using the first camera type and fifty scenes were filmed using the second camera type. A more detailed production information report might provide camera setting information, camera operator information, and/or setting location information.

Additionally, or alternatively, the processing functionality of the production information metadata processing logic 510 may be similarly implemented in the production information metadata processing logic 220 of the media device 102 (FIG. 2). For example, the user may request identification of media content events 114 that were filmed using a particular camera and/or a particular camera lens. The metadata distribution system 110 and/or the media device 102 may initially search their stored plurality of production information metadata content 120 to identify a plurality of media content event 114 that satisfy the specified search criteria. Further, the metadata distribution system 110 may generate a production information report that identifies the plurality of media content events 114, and may optionally communicate the related production information metadata content 120 of the identified media content events 114 to the media device 102. Additional searching and/or filtering may then be performed at the media device 102.

Some embodiments may be configured to provide information pertaining to access to the identified media content events 114. For example, the production information report presented to the user may correlate availability of media content events 114 with an EPG or the like. If one or more of the media content events 114 are available from another source, such as a media content on demand system, access information may be reported to the user. As another non-limiting example, if one or more of the media content events 114 are scheduled for presentation, the presentation schedule may be reported to the user. Alternatively, or additionally, if one or more of the media content events 114 are available from a movie or distributor of DVDs, the availability of the media content events 114 may be reported to the user. Further, the user may be presented the option of ordering and paying for selected ones of the media content events 114.

In some embodiments, the production information reports may include links to particular scenes of interest in the identified media content events 114 that are related to the search results. The scenes of interest may be identified using any suitable identifier, such as a time stamp, video frame identifier, and/or a special purpose flag, tag or the like that is inserted into the media content event 114. Thus, the user can conveniently access a particular scene of interest and have that scene presented on a media presentation system 122.

An exemplary user specified searching scenario illustrates operation of an exemplary embodiment of the production information metadata system 100. The media device 102 or the metadata distribution system 110 receives a user specification identifying at least one production information search parameter, such as a camera type. More than one production information search parameter may be specified by the user. Embodiments search at least one of the stored production information metadata content 120 associated with a media content event for instances of the user specified at least one production information search parameter. Embodiments then generate a production information report configured to present information pertaining to the identified instances of the identified at least one production information search parameter. In this example, the production information report indicates information relating to the camera type.

If the user is interested in identifying media content events 114 that were filmed using the specified camera type, the embodiments search a plurality of the stored production information metadata content 120, wherein each of the plurality of production information metadata content 120 is uniquely associated with one of a plurality of media content events 114. Embodiments then identify ones of the plurality of media content events 114 having at least one instance of the production information search parameter, here the camera type where the production information report lists the identified media content events 114. Further, embodiments may identify at least one scene in the media content events 114 that are associated with the production information search parameter. The production information report is configured to present information identifying the scenes of the identified media content events 114. In an exemplary embodiment, the media device 102 may receive a user presentation request identifying at least one of the identified plurality of media content events 114 having the at least one instance of the production information search parameter. The media content event 114 is accessed and presented to the user on the media presentation system 122. Then, the production information metadata content 120 associated with the scene is concurrently presented with the scene of the selected media content event 114. Accordingly, when the scenes are presented, the user is presented information indicating that the presented scenes were filmed with the selected camera type. Other information from the production information metadata content 120 may also be presented.

Another exemplary user specified searching scenario illustrates operation of an exemplary embodiment of the production information metadata system 100. The media device 102 or the metadata distribution system 110 receives a user specification identifying a plurality of production information search parameters, such as a camera type and a set location. Embodiments search the production information metadata content based upon a plurality of specified production information search parameters. The generated production information report presents information pertaining to the identified instances of at least one of the plurality of production information search parameters. For example, the production information report presents information pertaining to the camera type, the set location, or both the camera type and the set location.

Further, an exemplary embodiment identifies at least one scene of the media content event 114 having at least one instance of at least one of the production information search parameters. Accordingly, the production information report identifies scenes filmed using the camera type, scenes filmed at the set location, or both. As the user is presented the media content event 114 on the media presentation system 122, the production information report may be concurrently presented with the scene. For example, as the scene is presented, text or a graphical image may be presented to the user based upon the information in the production information metadata content 120.

Alternatively, the production information report may present information identifying the scenes having at least one instance of at least one of the production information search parameters. For example, a matrix of scene image thumbnails or short video clips may be presented to the user on the media presentation system 122. In response to receiving a user presentation request selecting one of the identified scenes, the scene is accessed from the media content event 114 and is presented to the user. For example, the user may be interested is visually assessing the performance of the specified camera type. Accordingly, the user is able to selectively view the scenes filmed using that camera type. As another example, the user may be interested is visually inspecting the sets at the specified set location. Here, the user is able to selectively view the scenes filmed at the specified set location.

It should be emphasized that the above-described embodiments of the production information metadata system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for processing production information metadata content associated with a media content event, comprising:

receiving a user specification identifying at least one production information search parameter specifying at least information pertaining to at least one camera used to film the media content event, information pertaining to lighting equipment used during the filming of the media content event, information pertaining to at least one microphone used during the filming of the media content event, and information describing set construction and design features used during the filming of the media content event;

searching production information metadata content associated with the media content event for instances of the user specified at least one production information search parameter, wherein the production information metadata content comprises information pertaining to production of the media content that includes the information pertaining to the at least one camera, the lighting equipment, the at least one microphone, and the set construction and design features used during the filming of the media content event; and generating a production information report configured to present information pertaining to the identified instances of the user specified at least one production information search parameter.

2. The method of claim 1, wherein the searching comprises:

searching a plurality of production information metadata content, wherein each of the plurality of production information metadata content is uniquely associated with one of a plurality of media content events.

3. The method of claim 2, further comprising:

identifying ones of the plurality of media content events having at least one instance of the production information search parameter, wherein the production information report is configured to present information identifying the media content events having the at least one instance of the production information search parameter.

4. The method of claim 3, for each of the identified plurality of media content events having the at least one instance of the production information search parameter, further comprising:

identifying at least one scene in the media content event that is associated with the production information search parameter, wherein the production information report is configured to present information identifying the at least one scene of the identified media content events having the at least one instance of the production information search parameter.

5. The method of claim 4, further comprising:

receiving a user presentation request identifying at least one of the identified plurality of media content events having the at least one instance of the production information search parameter; and presenting the production information report concurrently with the at least one scene of the selected media content event.

6. The method of claim 1, wherein the searching comprises:

searching the production information metadata content based upon a plurality of specified production information search parameters, wherein the generated production information report presents information pertaining to the identified instances of at least one of the specified plurality of production information search parameters.

7. The method of claim 6, further comprising:

identifying at least one scene of the media content event having at least one instance of at least one of the production information search parameters.

8. The method of claim 7, further comprising:

presenting the at least one scene of the media content event on a media presentation system; and concurrently presenting the production information report with the presented scene, wherein the production information report is configured to present information from the production information metadata content that is associated with the at least one of the production information search parameters.

9. The method of claim 7, further comprising:

presenting the production information report on a media presentation system, wherein the production information report identifies the at least one scene;

receiving a user presentation request selecting the scene;

accessing the selected scene of the media content event; and presenting the at least one selected scene of the media content event on the media presentation system.

10. The method of claim 1, further comprising:

receiving the user specification identifying the media content event; and accessing at least one of a plurality of production information metadata content that is associated with the specified media content event, wherein the searching of the production information metadata content is based upon the specified media content event and the at least one specified production information search parameter, and wherein the generated production information report presents information pertaining to the identified instances of at least one of the plurality of production information search parameters in the accessed production information metadata content.

11. The method of claim 10, wherein the accessed production information metadata content is an accessed first production information metadata content, and further comprising:

accessing a second production information metadata content from the plurality of production information metadata content that is associated with the specified media content event;

wherein the searching of the production information metadata content is based upon the specified media content event, the at least one specified production information search parameter, the accessed first production information metadata content, and the accessed production information metadata content, wherein the generated production information report presents information pertaining to the identified instances of at least one of the plurality of production information search parameters in the accessed first production information metadata content and the accessed second production information metadata content.

12. A method for processing production information metadata content, comprising:

receiving a plurality of production information metadata content comprising information pertaining to at least one camera used to film a media content event, wherein the information pertaining to the at least one camera includes at least one of a camera type, a camera manufacturer, a camera model identifier, a camera operation setting, a camera altitude, a camera attitude, a camera direction, a camera pitch, a camera lens and a camera movement during filming of the media content event;

storing the plurality of production information metadata content, wherein each of the plurality of stored production information metadata content is associated with one of a plurality of media content events;

receiving a user specification identifying the media content event; and accessing at least one of the plurality of production information metadata content that is associated with the specified media content event.

13. The method of claim 12, wherein the user specification identifying the media content event is a first user specification, and further comprising:

receiving a second user specification identifying at least one production information search parameter;

searching the accessed production information metadata content associated with the specified media content event for instances of the user specified at least one production information search parameter; and generating a production information report configured to present information pertaining to the identified instances of the user specified at least one production information search parameter.

14. The method of claim 13, wherein the plurality of production information metadata content is stored at a metadata distribution system that is accessible by a plurality of media devices via a communication system, and further comprising:

communicating the production information report to a media device that originated the user specification identifying the media content event.

15. The method of claim 13, wherein the plurality of production information metadata content is stored at a media device, and further comprising:

communicating the production information report to a media presentation device, wherein the production information report is presented on the media presentation device.

16. The method of claim 13, wherein the plurality of production information metadata content is stored at a metadata distribution system that is accessible by a plurality of media devices via a communication system, and further comprising:

communicating the accessed production information metadata content to an originating media device that originated the user specification identifying the media content event, wherein the searching and the generating is performed by the originating media device.

17. A media device, comprising:

a media content stream interface configured to receive at least one media content stream, wherein the media content stream comprises a plurality of media content events;

a memory configured to store at least one production information metadata content, wherein the stored production information metadata content comprises information pertaining to post production processing of an associated one of the plurality of media content events, wherein the post production processing information includes at least one of an aspect ratio used in scenes of the associated media content event, computer graphic imagery effects used in scenes of the associated media content event, color saturation adjustments used in scenes of the associated media content event, brightness adjustments used in scenes of the associated media content event, and sound track information used in the audio portion of the scenes of the associated media content event; and a processor system communicatively coupled to the media content stream interface, wherein the processor system is configured to:

receive a user specification identifying a media content event;

receive a user specification identifying at least one production information search parameter;

access the stored production information metadata content that is associated with the specified media content event;

search the accessed production information metadata content for instances of the user specified at least one production information search parameter; and generate a production information report configured to present information pertaining to the identified instances of the user specified at least one production information search parameter.

18. The media device of claim 17, further comprising:

a communication system interface communicatively coupled to the processor system and configured to receive the production information metadata content from a metadata distribution system, wherein the processor system is further configured to generate a request for the production information metadata content to the metadata distribution system based upon the user specified media content event, wherein the communication system interface is configured to communicate the request to the metadata distribution system, and wherein the communication system interface is configured to receive the production information metadata content communicated from the metadata distribution system.

19. The media device of claim 17, wherein the media content stream interface is configured to receive the at least one production information metadata content.

20. The media device of claim 17, further comprising:

a presentation device interface communicatively coupled to the processor system and configured to communicate the media content event and the production information report to at least one media presentation device, wherein the media content event and the production information report are concurrently presented.

\* \* \* \* \*